A. P. STEPHENS.
Sheet-Metal Cement-Lined Pipes.

No. 149,263. Patented March 31, 1874.

Witnesses.
John Becker.
Fred Haynes

Anson P. Stephens
by his Attorneys
Brown & Allen

AM. PHOTO-LITHOGRAPHIC Co. N.Y. (OSBORNE'S PROCESS.)

UNITED STATES PATENT OFFICE.

ANSON P. STEPHENS, OF BROOKLYN, NEW YORK.

IMPROVEMENT IN SHEET-METAL CEMENT-LINED PIPES.

Specification forming part of Letters Patent No. 149,263, dated March 31, 1874; application filed November 1, 1873.

*To all whom it may concern:*

Figure 1:
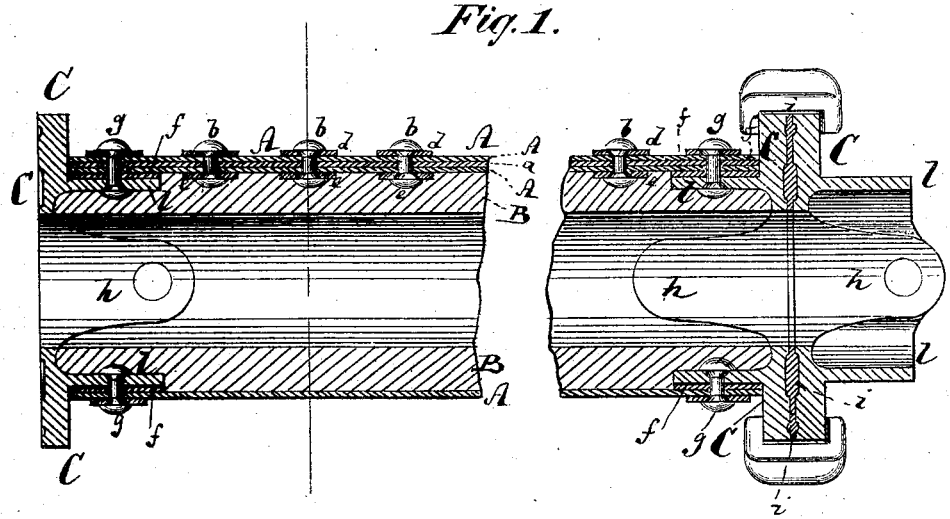
Figure 2:
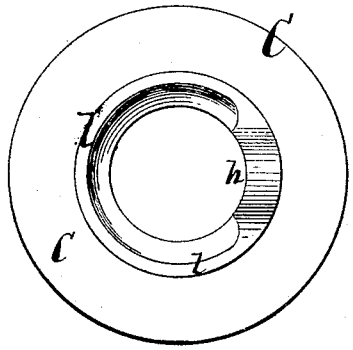
Figure 3:
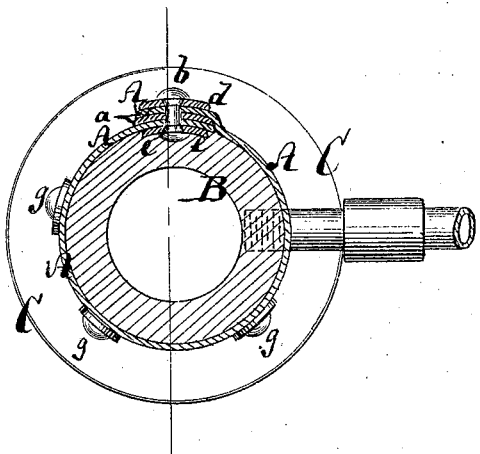

Be it known that I, ANSON P. STEPHENS, of Brooklyn, in Kings county and State of New York, have invented an Improvement in Pipe, of which the following is a specification:

Figure 1 is a longitudinal section of my improved pipe; Fig. 2, an end view of the cast head of the same; and Fig. 3, a transverse section of the pipe.

Similar letters indicate corresponding parts in all the figures.

This invention relates to several improvements in the construction of sheet-metal cement-lined pipe, used for conducting liquids, and other purposes; the object of the invention being, in the first place, to secure tight joints where the sheet metal forms the lap; secondly, to provide for a cement-lined sheet-metal pipe, as stated, a ready means for the application of cocks or branches after the pipe has been laid.

In the accompanying drawing, the letter A represents the sheet-metal shell or outer lining of the pipe, B being the cement inner lining of the same, and C C the cast heads or ends thereof. A plate, $a$, of lead or other soft metal or material, is interposed between the laps of the shell A—that is to say, between those portions where the longitudinal joint is formed in such shell. When, by means of rivets $b$, this joint is subsequently closed, said rivets passing both through the outer and inner laps, and also through the soft metal $a$, the latter is compressed and caused to firmly and effectually close the joint, and prevent all leakage at such joint. For the purpose of uniting the overlapping ends together I employ washers $d$ and $e$ on the said rivets $b$, the washers having conical apertures for the reception of the conical end portions of the rivets, as is clearly shown in Fig. 3, and also in Fig. 1.

Sheet-metal pipes were heretofore closed by plain rivets at their longitudinal joints; but such rivets being, necessarily, placed near the edges of the pipe, caused the thin metal to bulge up between them, for the reason that the bearing-surfaces of the rivet-heads were so small as to cause a more sudden depression at the place where they came in contact with the sheet metal.

By applying the washers in the manner shown, the bearing-surface of the rivet-heads on the sheet metal is enlarged, and the bulging between the rivets consequently prevented, a straight and proper joint being obtained, and by providing the ends of the rivets with conical portions to fit the conical apertures of the washers, the rivets are caused to draw the washers against the sheet metal, even if the heads of the rivets should not produce this effect, and even also before said heads bind firmly on both washers. By preference, one of the conical parts of the rivets is made sligtly longer than necessary to fit the washer, so that the lining $a$ will already be contracted during the hammering down of the outer rivet-head, and the inner soft-metal lining $a$ will also, consequently, be compressed, and gradually so, during the application of the rivets. Between the shell A and the cylindrical parts $l$ of the cast ends or heads C of the pipe is interposed a soft-metal lining. The cylindrical parts $l$ of the ends C are also, by means of rivets $g$, which are similar in construction to the rivets $b$, fastened to the shell A, the soft-metal lining $f$ being properly pressed by the application of such rivets forming the tight joints at the ends of each section of pipe.

Another feature of my invention consists in forming inwardly-projecting thick metal lugs $h$ on the cast heads C, such lugs being so thick that their inner surfaces will be in line with the inner surfaces of the cement lining B of the pipe. The lining B is thicker than the cylindrical part $l$ of each head, and covers said cylindrical part, but does not cover the projecting lug $h$, which is indicated in Fig. 1. The object of this lug is to facilitate, and, in fact, permit, the application of cocks, branch pipes, &c., to a pipe of my construction, and, in fact, to any cement-lined pipe. At the place where the thick lugs $h$ are beneath the lining A the pipe may be perforated, and a branch or cock applied, while without such additional projection and thickness on the head the cement-lined pipe could not be perforated, as the cement during the process of drilling would crumble away and become ineffective.

By the use of these lugs $h$ the one great objection to cement-lined pipe is overcome, which objection was based upon the impracticability of cement-lined pipes to receive branches, cocks, &c., after they had been laid.

I claim—

1. The combination of the cement pipe B, shell A, soft-metal plate $a$, washers $d$ $e$, and conical rivets $b$, substantially as described, for the purpose specified.

2. The cast-metal end C of a pipe provided with a projecting lug, $h$, which has the thickness of the cement lining of the pipe, as and for the purpose described.

ANSON P. STEPHENS.

Witnesses:
F. V. BRIESEN,
MICHAEL RYAN.